May 16, 1967     D. McDOUGALL ETAL     3,319,689

LOCKING WASHER

Filed Aug. 20, 1965

INVENTORS
DONALD McDOUGALL
ALBERT H. McKIBBIN

BY Charles A. Warren

ATTORNEY

United States Patent Office 3,319,689
Patented May 16, 1967

3,319,689
LOCKING WASHER
Donald McDougall, Portland, and Albert H. McKibbin, East Hartford, Conn., assignors to United Aircraft Corporation, East Hartford, Conn., a corporation of Delaware
Filed Aug. 20, 1965, Ser. No. 481,168
5 Claims. (Cl. 151—28)

This invention relates in general to lock nuts. It contemplates the use of a deformable lock washer which engages internal grooves or other surface discontinuities in a cooperating nut in any angular position of the nut whereby its relative rotation with respect to the washer is prohibited.

In high performance fluid pumps an internally threaded impeller nut is utilized to fasten the pump impeller on a keyed or splined shaft, the nut engaging cooperatting threads provided on the end of the shaft. To prevent loosening of the impeller during the operation of the pump due to retrogression of the impeller nut, means must be provided to prohibit relative rotation of the nut with respect to the shaft. Further, this locking function must be effected with a minimum of nut indexing in order to avoid the generation of excessive axial stress in the pump shaft at high operating loads and temperatures.

It is an object of this invention to provide means for preventing relative rotation of one member with respect to a second member in any relative angular position of the members.

Another object is to provide a nut locking device which is unaffected by temperature, centrifugal force or vibration and which will have no adverse effect on the balance of a rotating assembly.

An additional object is the provision of a locking device which does not protrude into or otherwise adversely interrupt the fluid flow path adjacent the locking device.

A further object is the provision of locking means for an impeller nut in a fluid pump whereby the nut may be locked or unlocked through an access axially aligned with the pump shaft.

These and other objects and advantages of this invention will be discussed in the following description or will be evident from the practice of this invention, the operation of which can best be described by reference to the preferred embodiments illustrated in the drawings in which.

Figure 3:
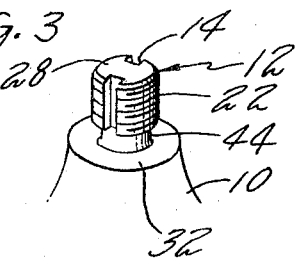
FIGURE 3 is a fragmentary view, in perspective, of the threaded end of a pump shaft carrying a pump impeller only the hub end of which is shown.

In FIGURE 3 a pump impeller 10, only the hub of the impeller being illustrated, is mounted on the end of a threaded pump shaft 12. The impeller is keyed to the shaft to prevent relative rotation therebetween. The specific means by which this relative movement is prohibited is not shown and forms no part of the present invention, the specific techniques utilized in this regard being well understood by those skilled in the art. The threaded end of the shaft 12 is provided with a pair of diametrically-opposed longitudinal grooves 14 in its outer surface, the grooves extending substantially parallel to the axis of the shaft. The number and cross-sectional configuration of these grooves are relatively immaterial since their sole purpose is to provide engagement with the lock washer 16 and, more specifically, with the legs 18 of the lock washer. The grooves 14 are of a suitable size and depth to closely contain the legs 18 of the lock washer entirely within the minor diameter of the shaft at threads 22.

Figure 1:
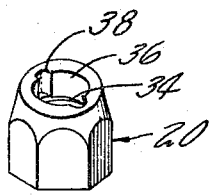
FIGURE 1 is a perspective view of a typical impeller nut usable in this invention, illustrating particularly the internal grooving therein.
Figures 2, 2A:
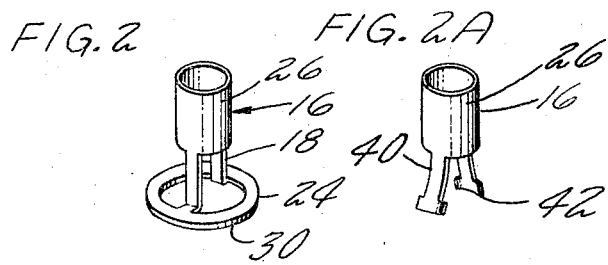
FIGURE 2 is a perspective view of the most preferred embodiment of the deformable lock washer.
FIGURE 2A is a perspective view of a second form of the deformable lock washer.

As is best illustrated in FIGURE 2, the lock washer 16 in its most preferred embodiment comprises a thin-wall flanged sleeve, the flange 24 being spaced from the sleeve portion 26 of the washer by a pair of oppositely-disposed upstanding legs 18. The legs 18 are made substantially equal in length to the distance between the upper surface 32 of the impeller and the end 28 of the pump shaft. In this manner when the washer is positioned on the assembly with the surfaces 30 and 32 abutting, the bottom end of the sleeve portion 26 of the washer will lie adjacent the upper surface 28 of the shaft. The internal diameter of the flange 24 is made slightly larger than the major diameter of the shaft at threads 22 to permit the washer to be passed thereover at assembly. Similarly the outer diameter of the sleeve portion 26 of the washer and the supporting legs 18 is necessarily made slightly less than the minimum internal diameter of the threads 34 in the nut 20, illustrated in FIGURE 1, to permit the nut to be passed over the washer and into engagement with the threads on the shaft.

Impeller nut 20 is provided with internal threads 34 in the lower portion thereof, the threads 34 being adapted to cooperate with those on the pump shaft. In the embodiment shown, an unthreaded portion 36 of substantial length is provided in the upper part of the nut, the unthreaded portion 36 carrying a pair of longitudinal grooves 38 in its internal surface. These grooves provide an engagement with the washer 16 when the sleeve portion 26 thereof is deformed at assembly in the manner shown in FIGURE 4. The number, shape and depth of the grooves 38 is relatively immaterial since their sole function is to provide engagement with the deformed sleeve portion of the lock washer.

After the impeller 10 has been suitably positioned on the shaft 12, the lock washer 16 is passed over the shaft until the flange 24 rests on the hub of the impeller, the legs 18 then nesting in the grooves 14 in the shaft. The nut 20 is then passed over the sleeve portion 26 of the washer until its threads engage those on the pump shaft and the nut is torqued to its predetermined optimum value. The wall of the sleeve portion of the washer is then deformed by some suitable means to force it into engagement with the grooves 38 in the nut. It will be evident that no indexing of the nut is required prior to deformation of the lock washer in the locking operation.

Figure 4:
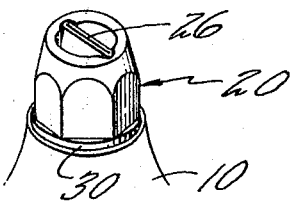
FIGURE 4 is a fragmentary perspective view of this invention as assembled, illustrating the impeller nut in the locked position.

In practice it has been found advantageous to provide sufficient length to the washer, and particularly the sleeve portion thereof, so that it protrudes above the top surface of the torqued nut and to crimp the washer in the plane of the grooves 34 as shown in FIGURE 4. If diagonal cutters are used in the crimping operation, the deformation of the sleeve and the removal of the excess length provided thereto may be accomplished in a single operation, and the washer may accordingly be severed flush with the upper end of the nut.

In the completed assembly it will be noted that since the flange 24 is held securely between the nut and the hub of the impeller axial translation of the washer with respect to the shaft is prevented. Further, since the legs 18 of the washer are in engagement with the grooves 14 in the pump shaft, and the sleeve portion 26 of the washer is in engagement with the grooves 38 in the nut, the nut cannot rotate relative to the shaft.

To disassemble the device it is necessary to, by some suitable means, release the washer from its engagement with the nut. In the embodiment shown in FIGURE 4 the unlocking function may be conveniently accomplished by driving a drift pin or other suitable instrument into the flattened portion of the washer whereby it is restored to its original cylindrical shape. The nut may then be unscrewed from the assembly.

It will be evident that the entire locking and unlocking functions may be conveniently performed through a small access which is substantially aligned with the longitudinal axis of the shaft. This capability is particularly advantageous in assemblies incorporating a number of complex elements formed to close tolerances and mounted on a single shaft. In centrifugal pumps or jet engines, for instance, access to the stacked elements is normally readily provided through an axially aligned opening. Through the use of this invention the removal and replacement of these elements may be completed with a minimum of pump or engine disassembly.

While we have illustrated the lock washer in its preferred embodiment as incorporating a flange portion 24 to prevent axial movement of the washer with respect to the shaft, other means are contemplated. The lock washer illustrated in FIGURE 2A will perform the same function as the more preferred embodiment. In this modified form T-shaped legs 40 are utilized, the T-shaped portion 42 of the legs 40 engaging surface 44 beneath the threaded portion 22 of the pump shaft whereby relative axial movement of the washer with respect to the shaft is prevented in the assembled device. Further, in this embodiment legs 40 will preferably be normally biased radially outward with the washer in the free-standing condition to permit ready removal of the washer through a small axial opening. During the assembly of a device incorporating this form of the washer, the nut in passing over the legs will force them into engagement with the shaft beneath the threads.

While this invention has been illustrated and described in connection with particular preferred embodiments thereof, it will be evident that many variations may be made in the construction and arrangement of parts within the scope of the appended claims.

What is claimed is:
1. A nut lock assembly comprising in combination:
a threaded shaft having longitudinal grooves in its outer surface at its threaded extremity,
a cooperating nut threaded on the shaft, the nut having a length exceeding its engagement length with the shaft, and
a lock washer to prohibit relative rotation between the shaft and the nut comprising a deformable sleeve closely encircled by the nut, the sleeve having a diameter not exceeding the internal diameter of the nut and being supported on a plurality of legs which engage the shaft within the grooves, the sleeve frictionally engaging the unengaged internal surface of the nut when the sleeve is crimped diametrically.

2. The nut lock assembly of claim 1 in which the lock washer is provided with means to restrain its longitudinal movement with respect to the shaft.

3. A nut lock assembly comprising in combination:
a threaded shaft having longitudinal grooves in its threaded surface,
a cooperating nut threaded on the shaft, the nut having a length exceeding its engagement length with the shaft and having indentations provided in its internal unengaged surface, and
a lock washer to prohibit relative rotation between the shaft and the nut comprising a deformable sleeve closely encircled by the nut, the sleeve having a diameter not exceeding the internal diameter of the nut and being supported on a plurality of legs which engage the shaft within the grooves, the sleeve engaging the indentations in the nut when the sleeve is crimped in the plane of the indentations.

4. A nut lock assembly comprising in combination:
a threaded shaft having longitudinal grooves in its threaded surface,
a cooperating nut threaded on the shaft, the nut having a length exceeding its engagement length with the shaft and having indentations provided in its internal unengaged surface, and
a lock washer to prohibit relative rotation between the shaft and the nut comprising a deformable flanged sleeve, the flange being longitudinally spaced from the sleeve by a plurality of legs, the legs engaging the shaft within the grooves provided therein, the sleeves having a diameter not exceeding the internal diameter of the nut and being closely encircled by the nut, the sleeve engaging the indentations in the nut when the sleeve is crimped in the plane of the indentations, the flange engaging the underside of the nut to restrain its longitudinal translation with respect thereto.

5. A nut lock assembly comprising in combination:
a threaded shaft having longitudinal grooves in its threaded surface,
a cooperating nut threaded on the shaft, the nut having a length exceeding its engagement length with the shaft and having indentations provided in its internal unengaged surface, and
a lock washer to prohibit relative rotation between the shaft and the nut comprising a deformable sleeve closely encircled by the nut, the sleeve having a diameter not exceeding the internal diameter of the nut and being supported on a plurality of T-shaped legs, the shank portion of the legs engaging the shaft within the grooves and the end portion of the legs engaging the shaft in a recess provided therein, the sleeve engaging the indentations in the nut when the sleeve is crimped in the plane of the indentations.

References Cited by the Examiner

UNITED STATES PATENTS

| 354,868 | 12/1886 | Lowman | 151—4 |
| 973,460 | 10/1910 | Rank | 151—28 |
| 1,552,681 | 9/1925 | Davis | 151—3 |
| 1,769,705 | 7/1930 | McGee | 151—8 |
| 1,770,523 | 7/1930 | Jellison | 151—4 |

FOREIGN PATENTS

| 147,785 | 2/1904 | Germany. |

CARL W. TOMLIN, *Primary Examiner.*

MARION PARSONS, JR., *Assistant Examiner.*